United States Patent [19]

Eiring et al.

[11] Patent Number: 4,732,561
[45] Date of Patent: Mar. 22, 1988

[54] APPARATUS FOR COOLING HOT MATERIAL

[75] Inventors: Karl Eiring; Manfred Durr, both of Oelde; Heinz-Herbert Schmits, Rheda-Wiedenbruck, all of Fed. Rep. of Germany

[73] Assignee: Krupp Polysius AG, Beckum, Fed. Rep. of Germany

[21] Appl. No.: 917,162

[22] Filed: Oct. 9, 1986

[30] Foreign Application Priority Data

Oct. 25, 1985 [DE] Fed. Rep. of Germany ....... 3538059

[51] Int. Cl.⁴ ............................................. F27D 15/02
[52] U.S. Cl. ..................................... 432/78; 110/285; 110/291
[58] Field of Search ............... 110/288, 291, 283, 285; 432/78

[56] References Cited

U.S. PATENT DOCUMENTS

| 1,344,144 | 6/1920 | Packard | 110/285 |
| 1,431,882 | 10/1922 | Erith | 110/291 |
| 1,629,282 | 5/1927 | Lundgren | 110/291 |
| 1,664,082 | 3/1928 | Mildon | 110/291 |
| 2,033,576 | 3/1936 | Hofft | 110/285 |
| 2,434,845 | 1/1948 | Gaffney | 432/78 |
| 3,920,380 | 11/1975 | Heian | 432/78 |
| 3,922,797 | 12/1975 | Dick | 432/78 |
| 4,059,396 | 11/1977 | Dano | 432/78 |
| 4,170,183 | 10/1979 | Cross | 110/291 |
| 4,452,152 | 6/1984 | John et al. | 110/291 |

Primary Examiner—Henry C. Yuen
Attorney, Agent, or Firm—Learman & McCulloch

[57] ABSTRACT

In apparatus for cooling hot material, a material transfer stage is provided in the material inlet of a cooler and acted on by cooling air. The transfer stage has a plurality of air-permeable carrier elements spanning the breadth of the inlet. At least one group of the carrier elements is arranged with a downward and forward inclination of approximately 10° to 20° in the direction of material transport. The carrier elements have forwardly facing sides provided with openings through which cooling air may pass.

26 Claims, 9 Drawing Figures

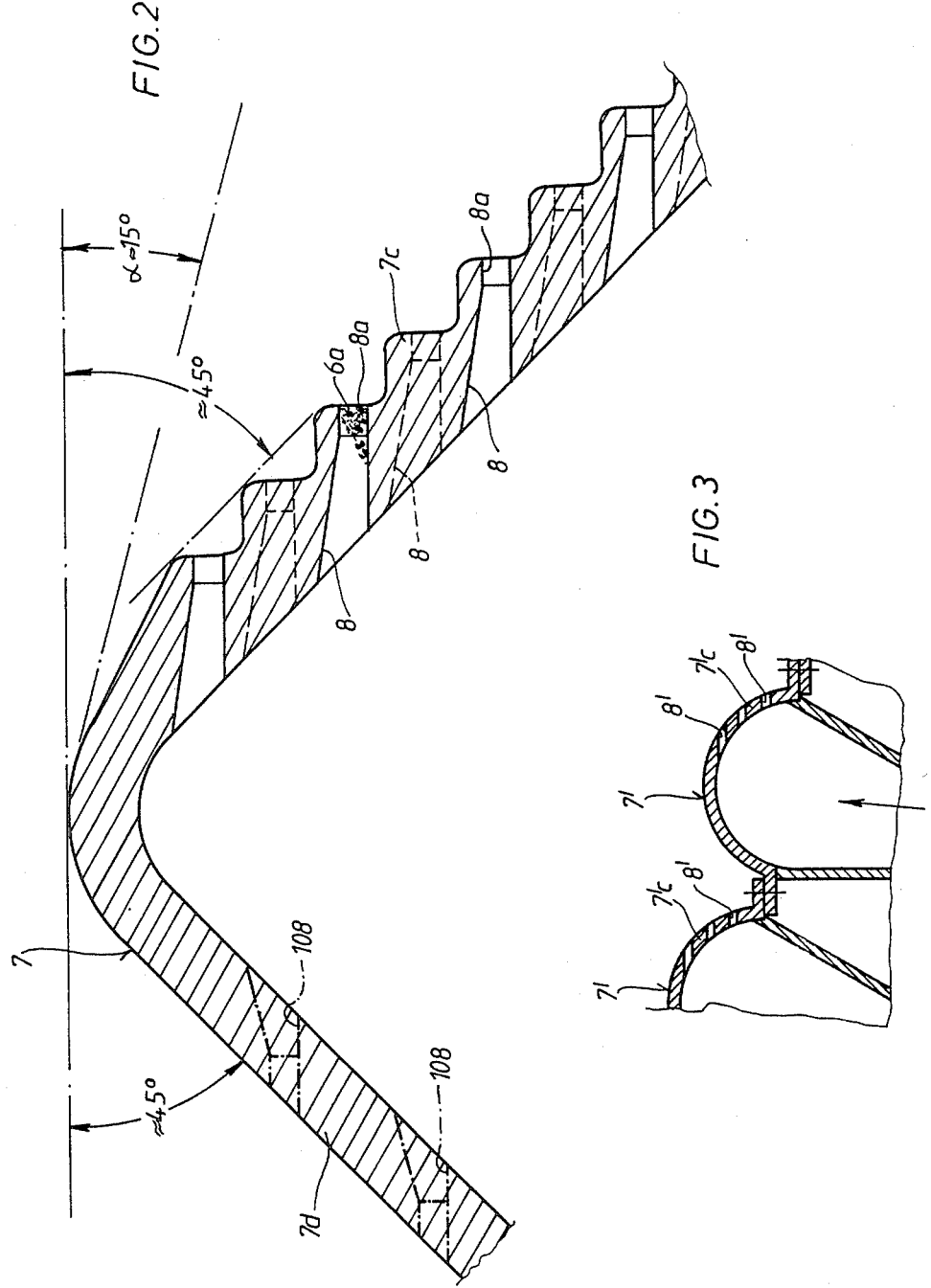

APPARATUS FOR COOLING HOT MATERIAL

The invention relates to apparatus for cooling hot material discharged from a kiln.

BACKGROUND OF THE INVENTION

Cooling apparatus of the general class to which the invention relates is used to cool material (e.g., cement clinker or other mineral materials), which has been burnt in a kiln. Such apparatus can comprise traveling grate coolers, thrust grate coolers, and the like. The red hot material discharged from the kiln outlet should undergo a first drastic cooling in the material inlet part of the cooling apparatus and should then be led, distributed as well as possible, to the grate on which the main cooling is then carried out while the material to be cooled is transported along a path extending through the cooler. At least the cooling air which is blown through the hot material in the material inlet part of the cooling apparatus should be reused or used further generally as air for combustion in the preceding kiln.

Cooling apparatus of the aforesaid type is known for example from German Auslegeschrift No. 11 08 606. In this case the material transfer stage in the material inlet part is constructed in the form of a brick chute which is adapted to the material angle of repose or slope and has a movable member arranged in its material conveying surface at right angles to the direction of flow of the hot material. In this known construction one must reckon in particular with corresponding construction costs for the transfer means and functioning of the movable member, considerable abrasion of the surface of the chute which is in contact with the material sliding downwards, and a mushroom-like buildup (growth) of hot material on the surface of the chute.

A principal object of the invention is to provide cooling apparatus of the general type referred to and in which, in particular, the material inlet part has material transfer stage which is improved over the prior art and is distinguished by particularly good heat recovery, material distribution, and extensive avoidance of the aforementioned mushroom formation. It is also desirable to prevent "red rivers" in the material running downwards ("red rivers" generally are understood to mean red hot, uncooled streams of material, e.g., streams of clinker).

SUMMARY OF THE INVENTION

In a cooler constructed according to the invention the material transfer stage is provided on its upper surface with individual air-permeable carrier elements which extend at right angles over the breadth of the inlet portion and in contrast to the known construction described above, are arranged in groups of carrier elements inclined downwardly in the direction of material transport at approximately 10° to 20° to the horizontal. In this way an embankment of the hot material discharged from the kiln outlet builds up over the carrier elements and is cooled quickly and drastically by the cooling air which is delivered specifically for this purpose. The material embankment which is cooled relatively drastically builds up at the natural angle of repose or slope of the particular material in each case and forms an impact layer for the following hot material so that, during normal operation, no following hot material runs over the air-permeable carrier elements and little or no wear occurs on the carrier elements and thus these can be constructed relatively simply.

The natural angle of repose which is formed on the one hand and the air holes which are provided in the forward facing sides of the carrier elements and aligned approximately in the material transport direction on the other hand then contribute both to reliable transport and particularly good distribution of the material over the whole breadth of the grate and to a particularly drastic cooling effect on the hot material, with optimum heat recovery.

Furthermore, with this mode of operation of apparatus according to the invention a separate water-cooling or air-cooling of the surfaces of the material transfer stage which come into contact with the material (such as is frequently necessary in the known constructions) is superfluous, and the aforementioned mushroom formation on the surface of the material transfer stage is largely avoided. In addition, and because of the thorough and deliberate introduction of cooling air into the material embankment which is built up, the formation of the "red rivers" also referred to above is effectively prevented.

THE DRAWINGS

Further details and advantages of the invention are disclosed in the following description of several embodiments which are illustrated in the accompanying drawings, wherein:

FIG. 2 is an enlarged, cross-sectional detail view through an air-permeable carrier element corresponding to the section II in FIG. 1;

FIG. 3 is a cross-sectional detail view similar to FIG. 2, but showing a different cross-sectional shape of the carrier elements;

DETAILED DESCRIPTION

Figure 1:
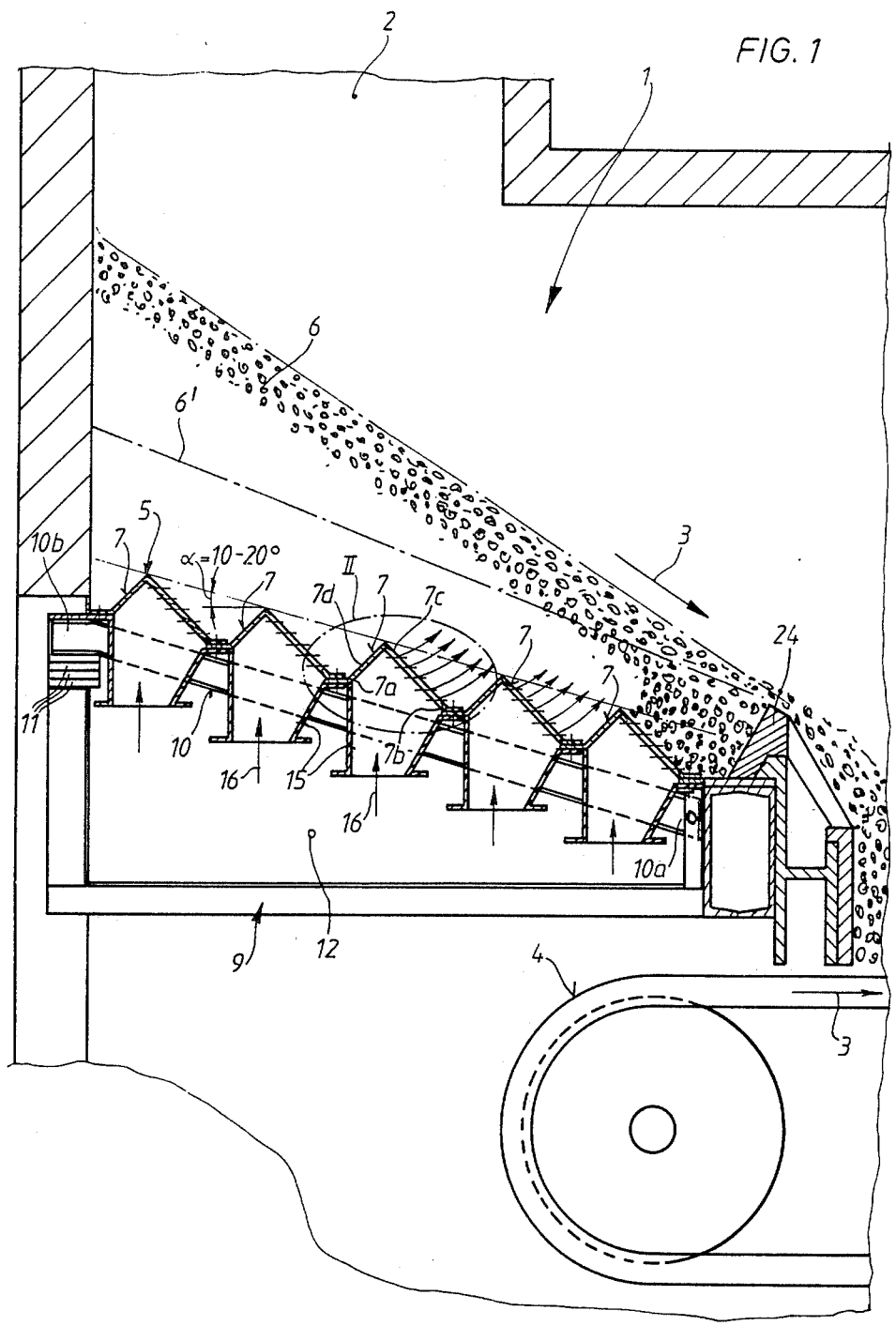
FIG. 1 is a simplified, longitudinal sectional view through the material inlet portion of the cooling apparatus.

The general construction of cooling apparatus according to one embodiment of the invention is disclosed in FIG. 1.

Of this cooling apparatus FIG. 1 shows mainly the material inlet portion 1 of a cooler and which is located in the region between the outlet 2 of a burning kiln (e.g. a rotary kiln) and the rear end, viewed in the material transport direction (arrow 3), of a grate which in this embodiment is indicated as a travelling grate 4. The traveling grate 4 can be of conventional construction so that indicating it quite schematically should be sufficient for the explanation of the present invention. However, it should be expressly mentioned at this point that the grate can be constructed in the form of any other suitable type of grate, e.g., a thrust grate.

The material inlet portion 1 is provided with a material transfer stage designated generally by 5 and which is inclined downwardly and toward the grate 4. As is explained in greater detail below, the material transfer stage receives the hot material discharged from the kiln outlet 2, subjects it to a first drastic cooling by means of cooling air, and distributes it evenly on the rear end of the traveling grate 4 through which cooling air also passes in a manner which is known per se and is therefore not illustrated in greater detail. The material is conveyed by the grate along a path (arrow 3) leading to an outlet (not shown) of the cooler.

The construction and assembly of the material transfer stage 5 are of particular interest. In the embodiment illustrated in FIG. 1 this material transfer stage 5 contains a group of five individual, elongated, air-permeable carrier elements 7 which extend transversely of the path 3 and span the breadth B (cf. FIG. 4) of the inlet portion. Each carrier element has a cross-sectional shape like a pointed roof and is sealingly secured to the adjacent element along its longer edges (e.g. 7a and 7b) by screws or the like that extend through flanges.

As is best shown in FIGS. 1 and 2, each of the air-permeable carrier elements 7 is provided on its forward facing long side 7c with a plurality of air holes 8 which have a round, slotted or any other suitable cross-section and pass through the sides 7c like channels and are aligned approximately in the material transport direction (arrow 3). The air holes 8 can be aligned horizontally (in the manner shown in FIGS. 1 and 2) or also at an acute angle to the horizontal (preferably directed a little upwards in the direction of movement of the grate). In a particularly advantageous manner these air holes taper towards their outlet (forward) ends 8a so as to produce a certain nozzle effect and also a material conveying effect. These air holes 8 are evenly distributed over the side 7c of each carrier element 7, and can be arranged in several rows one above the other and staggered in adjacent rows. These sides 7c of the carrier elements 7 can also have a substantially flat surface or a surface which, viewed in the cross-section of a carrier element 7, is somewhat stepped, so that the outlet openings 8a of the air holes 8 then open in each case in the part of a step which runs approximately horizontally. In each case the position and alignment of the holes 8 should be such that, in the event of a buildup of material 6a (see FIG. 2) in the region of an outlet end 8a of the holes 8, no material to be cooled can flow through these holes 8 into the interior of the carrier elements 7.

The forward facing sides 7c of each carrier element 7 are inclined to the horizontal at approximately 35° to 60°, preferably approximately 40° to 50° (in the case of FIGS. 1 and 2 an inclination of 45° is shown); the opposing rearward facing side 7d of each carrier element can also have the same inclination. These rearward sides 7d of the carrier elements 7 may be completely closed (that is to say without any air holes 8) in the illustrated embodiment according to FIG. 1. However, as indicated by dash-dot lines in FIG. 2, in case of need air holes 108 of similar construction to those in the sides 7c can also be provided in the sides 7d, which can serve for example to improve the aeration of the material embankment lying above the carrier elements 7.

The rearward facing long side 7d of each carrier element 7 is preferably kept somewhat narrower or shorter, viewed in cross-section according to FIGS. 1 and 2, than the forward facing sides 7c which are provided with the air holes 8. The way in which the carrier elements 7 which succeed each other in the material transport direction are connected as mentioned above on their edges 7a, 7b which are adjacent to one another and the previously mentioned difference in size of the sides 7c and 7d together result in an assembly of all the transversely extending carrier elements 7 in a group with an inclination α to the horizontally of between approximately 10° and 20°.

As is indicated generally in FIG. 1, the air-permeable carrier elements 7 are also preferably arranged in a common frame-like carrier support 9, in which the carrier elements 7 which are connected to one another in the manner mentioned above are supported directly on an inclined carrier 10 of the carrier support 9.

In order that the general inclination of the group of carrier elements 7 can be adjusted to between approximately 10° and 20°, it is preferable for the group of carriers 10 to be retained or clamped so that it is hinged at its lower end 10a (at the right-hand end in FIG. 1), whilst its upper end 10b (the left-hand end in FIG. 1) can have its height altered or set by means of plate-like shims 11.

Although according to FIGS. 1 and 2 a cross sectional shape approximately like a pointed roof is preferred for the air-permeable carrier elements 7, it is of course also possible to use other cross-sectional shapes which serve the same purpose, namely, on the one hand permit the desired outlet direction for the cooling air and on the other hand permit the material to slide downwards along the long sides.

One of these possible other embodiments is indicated in FIG. 3. According to this the air-permeatle carrier elements 7' have an approximately arcuate cross-section. The air holes 8' are again arranged and constructed on the forward facing sides 7'c so that they face approximately in the material transport direction as explained in the description of FIGS. 1 and 2. As can be seen in FIG. 3, the carrier elements 7 which are adjacent to one another can be connected in the same way as was explained in the first embodiment (for example by a flange-screw connection of adjacent long edges).

Figure 4:
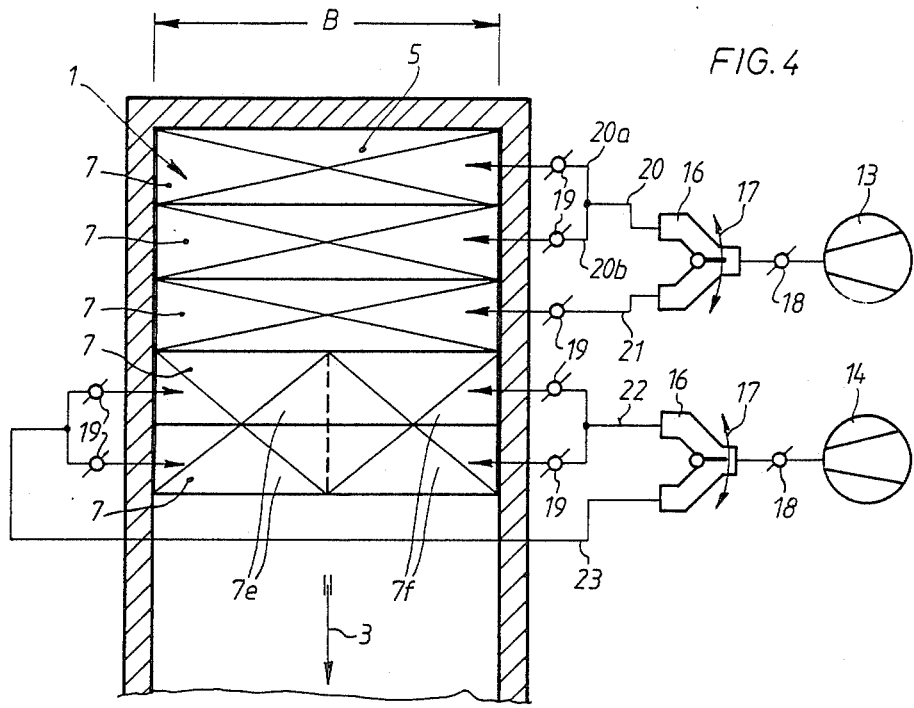
FIGS. 4 and 5 are greatly simplified schematic plan views of the material inlet portion for explanation of two different embodiments with differing cooling air supply systems.

The carrier frame 9 is closed like a housing so as to produce an internal space 12 as can be seen from FIG. 1 with which at least one cooling air blower 13 is associated, as can be seen in FIG. 4, and is explained in greater detail below; however, in the present embodiment two cooling air blowers 13, 14 are provided. It can also be seen in FIG. 1 that the lower parts of the individual carrier elements 7 are constructed in the form of short feed pipes for cooling air 15 so that, as is indicated in FIG. 1 oy arrows 16, cooling air can blow against the individual air-permeable carrier elements 7 from below, i.e. from the internal space 12.

It has proved particularly advantageous that these carrier elements 7 are not simply acted on jointly and simultaneously by cooling air from the cooling air blower (blowers) 13 or 14. Rather, it is preferable for the cooling air to be delivered in pulses to the individual carrier elements 7 or groups of carrier elements, in such a way that carrier elements 7 or groups of carrier elements which are adjacent to one another are connected alternately to the appertaining blower 13 or 14 for the supply of cooling air. For this purpose a pulsator 16' is positioned (cf. FIG. 4) between each cooling air blower 13 or 14 and the appertaining carrier elements 7 or groups of carrier elements. The pulsator preferably can be adjusted to a specific rhythm (with a frequency of for example 1 Hz) by having a valve shifted in the direction of the double-headed arrow 17 by a motor (not shown) so as to be regulable in order to control the alternating pulsating action of the cooling air on the carrier elements 7. It is further preferred to arrange a throttle valve 18 between each blower 13 or 14 and the appertaining pulsator 16' for adjusting the quantity of air and to arrange further throttle valves 19 between the pulsators 16' and the individual carrier elements 7 for the desired distribution of air.

In order that the carrier elements 7, either individually or in groups, can be acted on by cooling air in the required manner as mentioned above, the internal space 12 of the carrier frame 9 is divided into at least two chambers associated appropriately with short feed pipes for cooling air for the carrier elements 7. This means that the internal space 12 in the carrier frame 9 is at least divided into a number of chambers corresponding to the number of air-permeable carrier elements 7 if each carrier element 7 is to be capable of being connected individually to the cooling air blower 13 or 14, whereas it is suitably, adapted if at least some of the carrier elements 7 are combined into a group with a common air supply. Further details of these possibilities are explained by the following examples of air supply according to FIGS. 4 and 5.

FIG. 4 is a quite schematic plan view of the inlet portion 1 which is illustrated in FIG. 1. Accordingly there are also five air-permeable carrier elements 7 arranged in succession in the material transport direction (arrow 3) in the material inlet portion 1 or in the material transfer means 5 which forms the base of the inlet portion and can be supplied with air, and, as already explained above, all the carrier elements extend over the entire breadth B of the inlet portion 1.

If one now considers the action of the cooling air on this assembly of carrier elements 7, then the two rearmost carrier elements 7, viewed in the material transport direction (arrow 3), are connected via branch pipes 20a, 20b to a common connecting pipe 20 which comes from one side of the appertaining pulsator 16', whereas the third last carrier element 7 (that is to say the central carrier element) is connected via one single connecting pipe 21 to the other side of the pulsator 16'. This means that the two rearmost carrier elements 7 are combined as a group and acted on jointly by the cooling air (upon appropriate setting of the pulsator valve) and that the third last carrier element 7 alone has cooling air flowing through it alternately and in sequential pulses with the two rearmost carrier elements 7.

The situation is somewhat different with the two foremost carrier elements 7 adjacent the grate 4. These are divided in the transverse direction, i.e., approximately in the centre of the breadth B, into two cooling air sections 7e and 7f which lie adjacent to one another, but they are connected via their throttle valves 19, common connecting pipes 22 and 23, the appertaining pulsator 16', and the throttle valve 18 to the same cooling air blower 14. These two adjacent cooling air sections 7e and 7f of the two foremost carrier elements 7 can thus be acted on alternately and in pulses by cooling air via the appertaining pulsator 16'.

Figure 5:
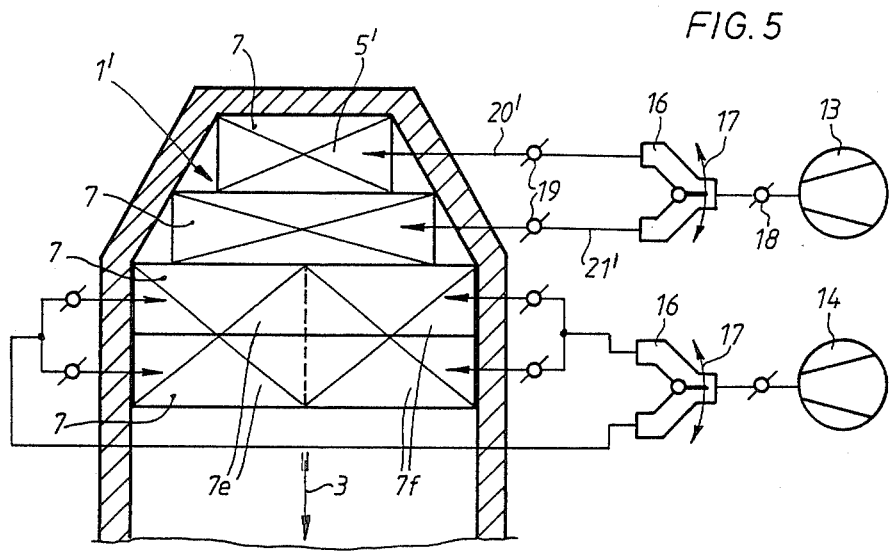

FIG. 5 shows a variant of the construction of the material inlet portion (which is therefore designated here by 1'). In this case the material transfer stage 5' has only four carrier elements 7 arranged successively in the material transport direction (arrow 3), but these can be constructed and combined or supported as was explained in detail on the basis of FIGS. 1 and 2. In this case too, just as in the case of FIG. 4, the pulsating cooling air is supplied to the air-permeable carrier elements 7 by means of two cooling air blowers 13 and 14 and by means of two pulsators 16' having valves which can be switched over in the directions of the double headed arrow 17, and similar throttle valves 18, 19 are again arranged in the air supply or connecting pipes. Whereas in FIG. 4 the two rearmost carrier elements 7, viewed in the material transport direction (arrow 3), are combined to a group with a common air supply, in the embodiment of FIG. 5 the two rearmost carrier elements 7 are connected via their connecting pipes 20' and 21' to different sides of the pulsator 16' and thus can be supplied individually and alternately with air (in pulses). The further difference between this construction according to FIG. 5 and the one according to FIG. 4 lies in the ground plan structure of the material inlet portion 1' in which the inlet portion 1' is symmetrically tapered at its rear end, viewed in the material transport direction (arrow 3), in the region of the two rearmost carrier elements 7 so that an approximately trapeziform ground plan is produced here and the two rear carrier elements 7 are thus kept shorter corresponding to the respective breadth.

In both the variants illustrated in FIGS. 4 and 5 carrier elements which are adjacent one another or groups of carrier elements can be supplied with cooling air alternately or in pulses and in adjustable quantities in the manner described. A particular advantage of this pulsating action of the cooling air on the air-permeable carrier elements 7 is that, in addition to the favorable aeration of the material embankment located above the material transfer stage 5 or 5', the material transport can be supported in a specific way in the direction of the arrow 3. This also results in a restratification of the material 6 in the embankment above the material transfer means 5 or 5' so that a particularly good distribution of quantity and uniform grain-size distribution can be achieved; this also contributes to the fact that the "red rivers" mentioned in the introduction can be eliminated right at their formation. With regard to the material embankment appearing on the material transfer stage 5 or 5' it should also be stated that this has a form according to the natural slope of the material itself.

In the explanation of the construction and assembly of the air-permeable carrier elements (between which channels to receive the material are formed) on the basis of FIG. 1 it was assumed that all the carrier elements 7 or 7' are retained fixed on the carrier 10 of the carrier frame 9. However, without its being necessary to illustrate this particularly in the drawings, it can readily be understood that at least one of the carrier elements, or even more, can be driven in the longitudinal direction of the cooling apparatus, i.e., in the material transport direction (arrow 3) for a thrust-like movement. Such a method of driving individual carrier elements could be achieved for example by means of push rod drives or the like which are well known in the art, inter alia in the case of thrust grate coolers.

In any case, the thrust-like movement of at least one of the carrier elements can also assist the further transport of the hot material in the direction of the grate; the same also applies to a restratification of the material within the embankment on the material transfer stage.

In the construction and arrangement of the material transfer stage 5 or 5', it can basically be sufficient in many cases to maintain a basic embankment largely resting on the material transfer stage. However, it is generally, preferred for a material damming element of approximately beam-like construction which extends transversely across the breadth of the material inlet portion 1 to be positioned at the lower end of the material transfer stage 5, that is to say in the region of the transition from the material transfer stage to the grate 4, to serve additionally for damming up an essentially static basic material embankment which can adjust itself approximately as far as the dash-dot line 6' in FIG. 1 (with a basic clinker embankment this could happen at an angle of approximately 20° to the horizontal, depending upon the clinker grain size). The height of this material damming element 24 is essentially dependent upon the desired height of the basic embankment (which can for example depend upon the expected temperatures of the hot material and its abrasiveness).

Figure 6:
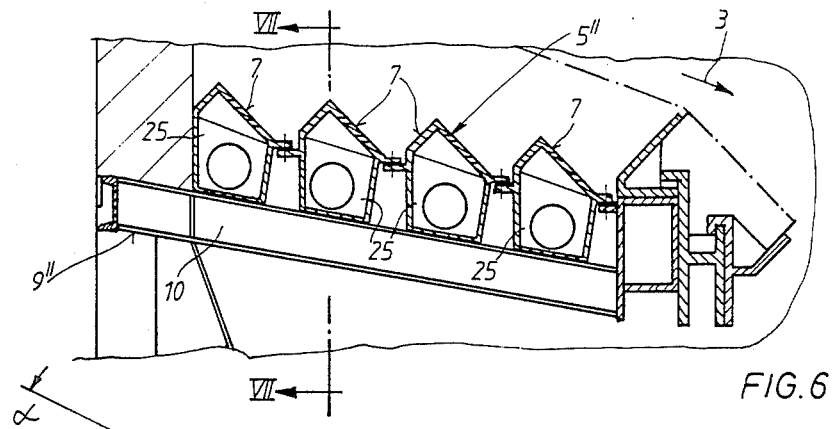
FIG. 6 is a partial longitudinal sectional view, similar to that of FIG. 1, of the material inlet portion, particularly the material transfer means, of another embodiment.
Figure 7:
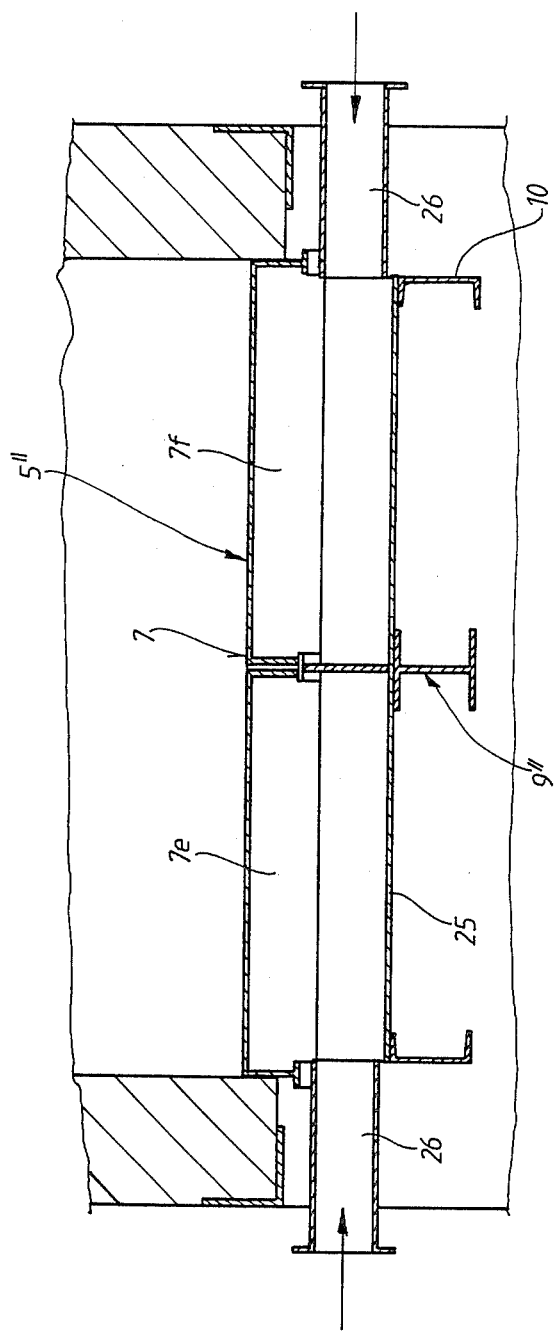
FIG. 7 is a partial cross-sectional view along the line VII—VII in FIG. 6.

FIGS. 6 and 7 show a variant of the first embodiment disclosed in FIGS. 1 and 2. Apart from the fact that the material transfer stage 5" in this case contains only four carrier elements 7, which are of similar construction and arrangement to those in the first embodiment, these carrier elements 7 are not essentially supported directly on the carrier 10 of the carrier frame 9, but rather each carrier element 7 is supported on the carrier frame 9" or its carrier 10 with a chamber-like cooling air supply box 25 interposed. The closed construction of the carrier frame 9, like a housing as explained above, is rendered unnecessary by this construction in which each cooling air supply box 25 of the individual carrier elements 7 is connected directly to the appertaining pulsator or the appertaining blower (in accordance with FIGS. 4 or 5). For this purpose each cooling air supply box 25 has at least one lateral air connection pipe 26. Accordingly, if it is a question of rear carrier elements (viewed in the material transport direction according to the arrow 3) in accordance with the explanations of FIGS. 4 and 5, one single lateral air connection pipe 26 is sufficient since these rear carrier elements 7 have air acting on them simultaneously over the whole breadth of the inlet portion, whereas in the case of a construction as a front carrier element 7 one air connection pipe 26 can be provided on each side (as indicated in FIG. 7) in order for cooling air to be able to act alternately on the cooling air sections 7e and 7f which lie adjacent to one another of the same carrier element.

It is, of course, possible to include a construction like that shown in FIGS. 6 and 7 in the embodiment of FIG. 1 (in which the carrier frame 9 is closed like a housing). Such a combination recommends itself in particular when, as explained above, individual carrier elements are constructed so as to be driven for thrust-like movement. In this case it is preferable for those carrier elements 7 which are fixed to have cooling air supply pipes 15 which are open towards the bottom and the movable carrier elements to have cooling air supply boxes 25 with lateral air connection pipes 26 so that the types of air supply described in connection with FIGS. 4 and 5 can also be achieved without difficulty in this embodiment.

Figure 8:
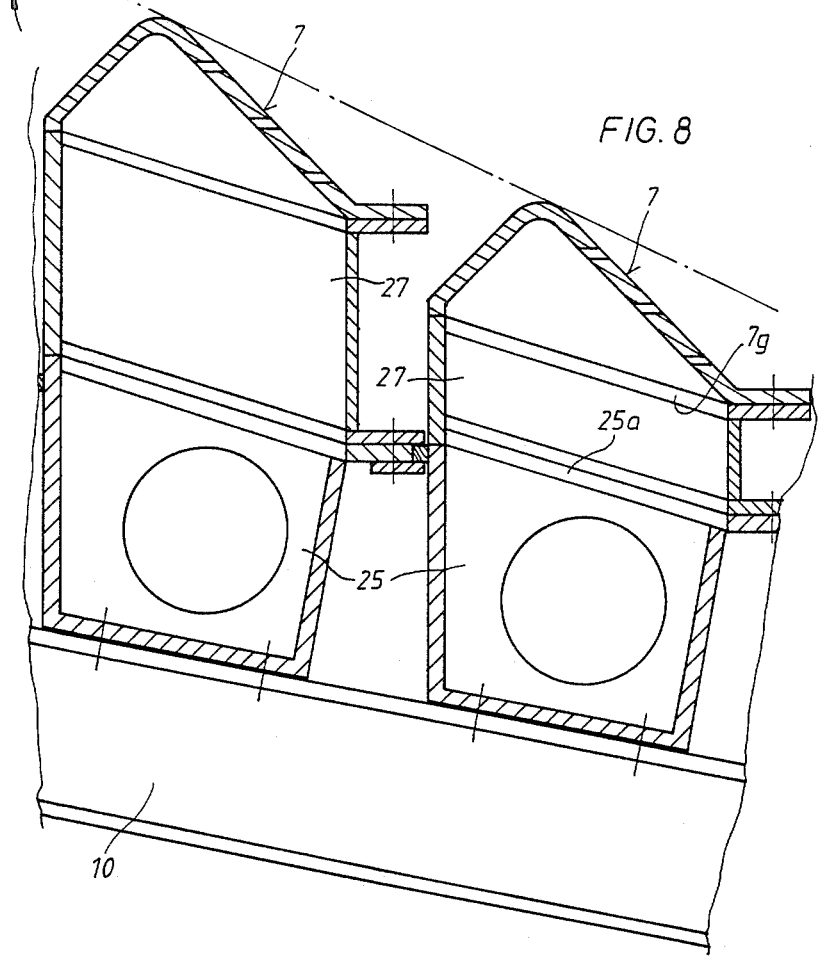
FIG. 8 is a sectional view through two carrier elements of a further embodiment.

When each carrier element 7 is supported on the carrier 10 with a chamber-like cooling air supply box 25 interposed, a further variant recommends itself by means of which the general inclination according to angle $\alpha$ (between 10° and 20°) of all carrier elements 7 of one material transfer stage can be set. As FIG. 8 shows, a further intermediate box 27 which is open at top and bottom and is adapted in cross-section and length to the open underside 7g of the appertaining carrier element and the equally open upper side of the cooling air supply box 25 is arranged between each carrier element 7 and the appertaining cooling air supply box 25. Because of the difference in vertical height of the individual intermediate boxes 27 the general inclination (angle $\alpha$) of the carrier elements 7 can be altered without any alteration in the angle setting position of the carrier 10 being necessary.

Figure 9:
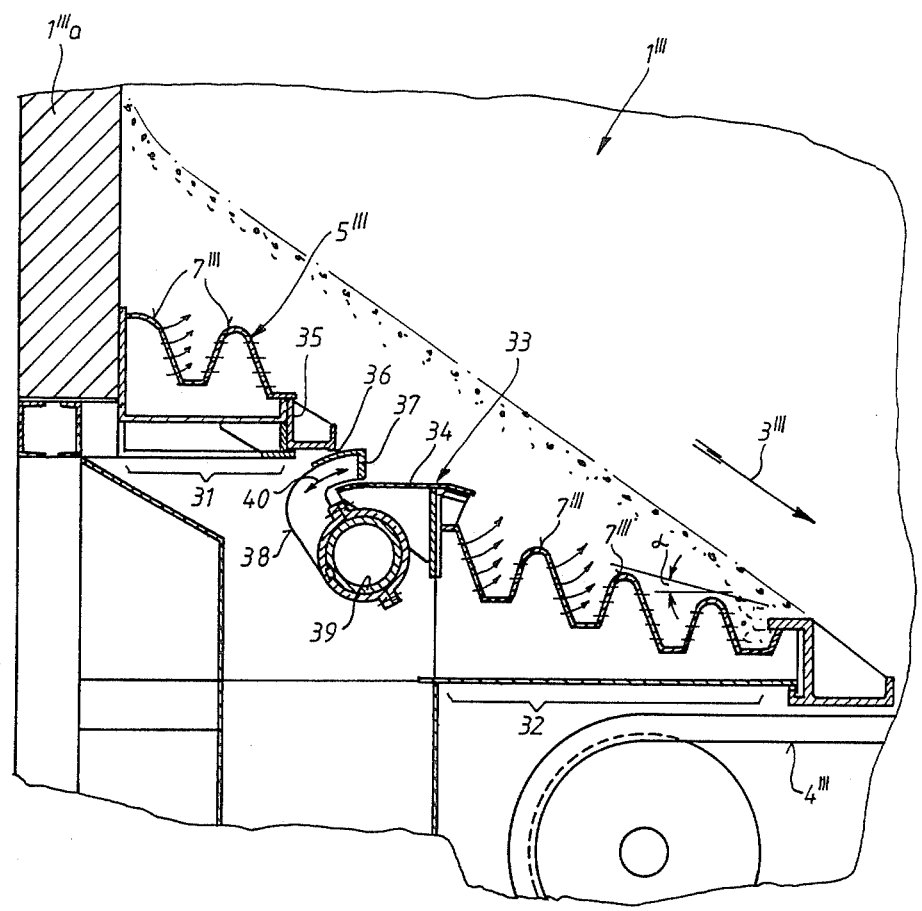
FIG. 9 is a partial longitudinal sectional view similar to FIG. 1 of the material inlet portion for a further embodiment.

A further embodiment of the material inlet portion 1''' of the cooling apparatus is illustrated in FIG. 9. In this embodiment similar parts are designated by the same reference numerals as in the preceding embodiments but modified by a triple prime so that a detailed description of these parts is largely superfluous.

Whereas in the preceding embodiments all of the transverse carrier elements of the material transfer stage are directly connected to one another (cf. in particular FIGS. 1 and 6) in the direction of material transport, in the embodiment according to FIG. 9 the carrier elements 7''' are combined in two groups 31 and 32 which are separate from one another, so that in the region of the rear wall 1'''a of the material inlet portion 1''' for example two carrier elements 7''' form an upper rear group of carrier elements 31 and in the region above the inlet end of the traveling grate 4''' for example four carrier elements 7''' form a lower front group of carrier elements 32. A step-like connecting ledge 33 which contains a step-like stationary bearing surface 34 extending transversely over the internal breadth of the material inlet portion 1''' is provided between these two succeeding groups of carrier elements 31 and 32. A wear prevention box 35 which is mounted on the adjacent carrier element 7''' and also extends transversely over the whole clear space of the material inlet portion 1''' is preferably provided between the bearing surface 34 which is essentially aligned horizontally and the carrier element 7''' which is adjacent to it of the rear group of carrier elements 31.

A transverse slot 36 is located between the wear prevention box 35 and the top of the bearing surface 34. At least one thrust bar 37 which extends at right angles to the material inlet portion 1''' is provided in the transverse slot. This thrust bar 37 can extend over the entire clear breadth of the material inlet portion 1''' (which is generally preferred), but it can also extend only over a part of the entire clear breadth or it is also possible to provide more than one such thrust bar or one thrust bar divided over the breadth of the material inlet portion. In each case this thrust bar 37 is mounted to be movable to and fro in the material transport direction (arrow 3'''). For this reason the thrust bar 37 is part of a rockable ram 38 which is fixed on a rotary shaft 39 which in turn is arranged transversely below the material transfer stage 5'''. This rotary shaft 39 is connected to a pivot drive which is capable of being operated so as to move to and fro and is known per se (and therefore not shown in detail in the drawing) and which can be for example a cylinder drive or a crank drive which is operated by a pressure medium that acts on a lever of the rotary shaft 39 and is arranged outside the housing of the material inlet portion 1'''. In this way the rotating ram 38 and thus the thrust bar 37 which it supports are movable to and from in the direction of the double headed arrow 40 in the material transport direction (arrow 3''') inside the transverse slot 36 and on the top of the bearing surface 34.

By the provision of this rotating ram 38 with the thrust bar 37 the material resting in the region of the step-shaped connecting ledge 33 can be acted upon in such a way that the further transport of the hot material is additionally assisted, caking on of the hot material is avoided and any deposits or incrustations can be broken down; however, at the same time any larger individual lumps falling through the material embankment can be acted upon so that mushroom formations such as frequently occur in the known constructions are avoided through the further transport. Moreover, if cooling air is also introduced in the region of the transverse slot 36 and the rotating ram 38 this contributes not only to the cooling of these elements which can be moved to and fro but also to improved aeration of the material resting in this region.

The rotating ram 38 can be driven via the rotary shaft 39 (and the appertaining drive) in such a way that it works with a stroke of approximately 100 mm and a stroke rate of approximately 5-22 per minute, this stroke rate being continuously variable if desired.

The number of air-permeable carrier elements arranged one after another in the material transport direction can be adapted to the size and other requirements of the particular cooling apparatus. As has already been explained above, the air holes in the carrier elements can be constructed in the form of bores or slots. It is also advantageous if the total opening area of these air holes is such that the cooling air emerges from the air holes at a maximum speed of approximately 50 m/s and enters the material to be cooled at this speed.

With regard to the transverse distribution and possible types of air supply of the carrier elements as explained in particular with the aid of FIGS. 4 and 5 it should also be mentioned that, if desired, all the carrier elements can also be divided up in the transverse direction into two cooling air sections lying adjacent to one another.

The individual carrier elements themselves can be produced in a simple manner. Above all it can be advantageous if at least the parts of these carrier elements which come into contact with the material are produced from heat-resistant material, particularly cast steel, and the parts lying below them produced from less heat-resistant steel plate; in addition, the parts of the carrier elements which come into contact with the material can also be provided if desired with a particularly fireproof and abrasion-proof layer of known construction.

What is claimed is:

1. In apparatus for cooling hot material discharged from a kiln or the like to a cooler grate via an inlet, the improvement comprising a transfer stage interposed between said kiln and said grate and occupying said inlet and over which said material moves along a path from said kiln to said grate, said transfer stage comprising a group of individual carrier elements connected to one another and extending transversely across the length and breadth of said inlet, a common frame supporting all of said carrier elements, each of said elements having air holes through at least one wall thereof extending along said path, said group of elements being downwardly inclined between about 10° and 20° to the horizontal in the direction of movement of said material, and means for adjusting said frame to a position in which the inclination of said carrier elements enables said transfer stage to support thereon a layer of said material at its angle of repose, thereby enabling said layer of material to provide a protective covering for said carrier elements and enabling additional material discharged onto said layer to move along said path, said air holes being aligned to direct air in the direction of material movement along said material transfer stage.

2. Apparatus according to claim 1 wherein each of said carrier elements has a roof-like cross-sectional shape forming a forward facing side and a rearward facing side, said forward facing side having said air holes therein and inclined at approximately 35° to 60° to the horizontal.

3. Apparatus according to claim 1 wherein each of said carrier elements has an arcuate cross-sectional shape.

4. Apparatus according to claim 1 wherein said air holes extend substantially horizontally along said path.

5. Apparatus according to claim 1 wherein said air holes extend along said path at an acute angle to the horizontal.

6. Apparatus according to claim 4 wherein said air holes taper in the direction of material transport.

7. Apparatus according to claim 1 wherein each of said carrier elements has a forward side facing in the direction of material movement and a rearward side facing in the opposite direction, and wherein said air holes are in both of said sides.

8. Apparatus according to claim 1 wherein said adjusting means comprises shims.

9. Apparatus according to claim 1 wherein said frame forms a closed housing enclosing said carrier elements, said carrier elements having their lower surfaces in communication with said housing.

10. Apparatus according to claim 9 wherein said housing is divided into at least two chambers.

11. Apparatus according to claim 1 including means for supplying cooling air in pulses to the air holes of said carrier elements.

12. Apparatus according to claim 11 including means for supplying pulses of air sequentially to selected ones of said carrier elements.

13. Apparatus according to claim 11 wherein said cooling air supplying means includes a box in communication with the air holes of a selected number of said carrier elements, said box having at least one air pipe in communication therewith.

14. Apparatus according to claim 10 wherein said means for supplying cooling air includes at least one cooling air blower having valve means operable to generate pulses in air delivered to the carrier elements.

15. Apparatus according to claim 14 wherein at least one of the carrier elements is divided transversely into two cooling air sections which are connected to the same cooling air blower.

16. Apparatus according to claim 14 wherein at least two adjacent carrier elements remote from said conveyor are connected to the same cooling air blower.

17. Apparatus according to claim 1 wherein all of said carrier elements are stationary.

18. Apparatus according to claim 1 wherein at least one of said carrier elements is movable longitudinally of said path.

19. Apparatus according to claim 18 including first means for supplying cooling air to the movable carrier elements and second means for supplying cooling air to the remaining carrier elements.

20. Apparatus according to claim 1 including a material damming element extending transversely of said material transfer stage at its lower, forward end.

21. Apparatus according to claim 1 wherein a transverse slot is provided between two adjacent carrier elements, and wherein a thrust bar extends through said slot and is movable to and fro in the direction of material transport.

22. Apparatus according to claim 21 including means for moving said thrust bar to and fro.

23. Apparatus according to claim 1 wherein said air holes are in the form of bores.

24. Apparatus according to claim 1 wherein said air holes are in the form of slots.

25. Apparatus according to claim 1 wherein the total area of said air holes is such that cooling air flows through said carrier elements at a maximum speed of approximately 50 m/s.

26. Apparatus according to claim 1 wherein those parts of the carrier elements which are engageable by said material are formed from a relatively high heat-resistant substance, whereas the remaining parts are formed from a relatively less heat-resistant substance.

* * * * *